United States Patent
Lee et al.

(10) Patent No.: US 8,218,482 B2
(45) Date of Patent: Jul. 10, 2012

(54) APPARATUS AND METHOD FOR CALL SETUP IN A WIRELESS COMMUNICATION SYSTEM

(75) Inventors: Sang-Min Lee, Seoul (KR); Yung-Soo Kim, Seongnam-si (KR); Il-Won Kwon, Ansan-si (KR); Hyung-Myung Kim, Daejeon (KR); Woo-Geun Ahn, Yeongcheon-si (KR); Dae-Hyun Kim, Seongnam-si (KR)

(73) Assignees: Samsung Electronics Co., Ltd., Suwon-si (KR); Korea Advanced Institute of Science and Technology, Daejeon (KR)

(\*) Notice: Subject to any disclaimer, the term of this patent is extended or adjusted under 35 U.S.C. 154(b) by 595 days.

(21) Appl. No.: 12/372,045

(22) Filed: Feb. 17, 2009

(65) Prior Publication Data
US 2009/0209260 A1    Aug. 20, 2009

(30) Foreign Application Priority Data
Feb. 20, 2008  (KR) .................. 10-2008-0015197

(51) Int. Cl.
*H04W 4/00* (2009.01)
*H04B 7/00* (2006.01)

(52) U.S. Cl. .................. 370/328; 455/518; 455/521
(58) Field of Classification Search .................. None
See application file for complete search history.

(56) References Cited

U.S. PATENT DOCUMENTS

| | | | |
|---|---|---|---|
| 2001/0036810 A1* | 11/2001 | Larsen ................... | 455/11.1 |
| 2004/0063451 A1* | 4/2004 | Bonta et al. ................. | 455/518 |
| 2007/0032230 A1* | 2/2007 | Pregont .................... | 370/328 |
| 2008/0219202 A1* | 9/2008 | Pandey et al. .............. | 370/315 |

\* cited by examiner

*Primary Examiner* — Steven H Nguyen
(74) *Attorney, Agent, or Firm* — Jefferson IP Law, LLP

(57) ABSTRACT

An apparatus and method for call setup in a wireless communication system are provided. A first Mobile Station (MS) determines a DownLink (DL) duration, performs synchronization, selects one preamble code among a preamble code set reserved for the call setup of the MS out of the cell area, and transmits the selected preamble code during the determined DL duration. A second MS scans a preamble code during the DL duration, determines if the scanned preamble code is a preamble code for the call setup of the MS out of the cell area, and transmits a response message to the preamble code to the first MS.

6 Claims, 8 Drawing Sheets

APPARATUS AND METHOD FOR CALL SETUP IN A WIRELESS COMMUNICATION SYSTEM

PRIORITY

This application claims the benefit under 35 U.S.C. §119(a) of a Korean patent application filed in the Korean Intellectual Property Office on Feb. 20, 2008 and assigned Serial No. 10-2008-0015197, the entire disclosure of which is hereby incorporated by reference.

BACKGROUND OF THE INVENTION

1. Field of the Invention:

The present invention relates to a wireless communication system. More particularly, the present invention relates to an apparatus and method for performing call setup by a relay of a Mobile Station (MS) being at a cell edge to provide a communication service to an MS being out of a cell area in a wireless communication system.

2. Description of the Related Art:

Wireless communication systems support an emergency call service to quickly address an emergency situation such as an accident, etc. Types of the emergency call service may be described as follows.

A first type is using a predetermined key to a wireless communication terminal, or pressing a combination of keys, thus establishing a quick emergency call.

A second type is enabling a quick connection to a predetermined contact using a menu of a wireless communication terminal.

FIGS. 1A, 1B and 1C illustrate an emergency call using Peer-to-Peer (P2P) communication in a wireless communication system according to a conventional art.

Referring to FIG. 1A, a Mobile Station (MS) 102 is within a cell area 100 enabling signal reception from a Base Station (BS) 101 and thus, communicates with the BS 101 through radio resources (e.g., frequencies) (104). An MS 103 is out of the cell area 100 and disables signal reception from the BS 101 and thus, is not able to communicate with the BS 101 (105). If it is an UpLink (UL) transmission duration, the MS 102 is allocated UL resources and performs UL transmission using a power level receivable by the BS 101 (106). At this time, the MS 102 can forward a signal even to the neighboring MS 103 that is out of the cell area 100 (107) as shown in FIG. 1B. Thus, when the MS 103 sends an emergency call request, etc., out of the cell area 100 (109), the MS 103 can perform an emergency call with the BS 101 (108) through the neighboring MS 102 as shown in FIG. 1C because the MS 103 is not able to directly communicate with the BS 101.

In order to provide an emergency call service to the MS 103 being out of the cell area 100 through a relay of the MS 102 being at a cell edge portion, synchronization procedures between the two MSs 102 and 103 have to be essentially performed. In the conventional art, in order to achieve synchronization between the MS 103 sending an emergency call request and the MS 102 relaying the emergency call request up to the BS 101, the MS 103 has to continuously transmit an emergency call request message until receiving an acknowledgement message to the emergency call request using reserved resources. Because of this, the MS 103 increasingly consumes power until receiving the acknowledgement message responsive to the emergency call request.

An emergency call seldom occurs. Also, the MS 102 receiving a communication service from the BS 101 is not able to recognize when an emergency call is generated. If resources to be used in the event of an emergency call are always reserved through allocation of a specific time-frequency resource among wireless communication resources but is not used in the BS 101, frequency efficiency is deteriorated. If an MS transmits a packet for an emergency call request using any time-frequency resource, the MS may cause interference on other MSs within a corresponding service coverage area.

As described above, in the conventional art, if an MS is out of a service coverage area and encounters an emergency situation, MSs being at a cell edge portion are difficult to recognize when an emergency call is generated upon an emergency call request. Furthermore, operating time-frequency resources in a manner in which they are always reserved for such an emergency call results in a great disadvantage in efficiency.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting a communication service for Mobile Stations (MSs) that are out of a service coverage area in a wireless communication system.

The above aspects are achieved by providing an apparatus and method for call setup in a wireless communication system.

In accordance with an aspect of the present invention, a Mobile Station (MS) for call setup out of a cell area in a broadband wireless communication system is provided. The MS includes a monitoring unit, a synchronizer, and a controller. The monitoring unit monitors a received power level during one or more frame durations. The synchronizer determines a DownLink (DL) duration considering a variation of the received power level. The controller synchronizes to a start of the determined DL duration and transmits a predefined preamble code.

In accordance with another aspect of the present invention, an MS for relaying an MS that is out of a cell area in a broadband wireless communication system is provided. The MS includes a controller for scanning a preamble code during a DL duration, for determining if the scanned preamble code is a preamble code for call setup of the MS that is out of the cell area, and for transmitting a response message to the preamble signal for the call setup of the MS out of the cell area to an MS transmitting the preamble.

In accordance with yet another aspect of the present invention, a system for performing call setup of an MS that is out of a cell area and relaying the MS out of the cell area by an MS that is at a cell boundary is provided. The system includes a first MS and a second MS. The first MS determines a DL duration, performs synchronization, selects one preamble code among a preamble code set reserved for the call setup of the MS out of the cell area, and transmits the selected preamble code during the determined DL duration. The second MS scans a preamble code during the DL duration, determines if the scanned preamble code is a preamble code for the call setup of the MS out of the cell area, and transmits a response message to the preamble signal to the first MS.

In accordance with still another aspect of the present invention, a method for call setup of an MS that is out of a cell area in a broadband wireless communication system is provided. The method includes monitoring a received power level during one or more frame durations, determining a DL duration considering a variation of the received power level, and synchronizing to a start of the determined DL duration and transmitting a predefined preamble code.

In accordance with further another aspect of the present invention, a method for relaying an MS that is out of a cell area in a broadband wireless communication system is provided. The method includes scanning a preamble code during a DL duration, determining if the scanned preamble code is a preamble code for call setup of the MS out of the cell area, and transmitting a response message to the preamble signal for the call setup of the MS out of the cell area, to the MS transmitting the preamble.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description when taken in conjunction with the accompanying drawings in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

An exemplary apparatus and method for setting up an emergency call of a Mobile Station (MS) that is out of a service coverage area in a broadband wireless communication system are described below.

A DownLink (DL) preamble is used for MSs within a cell area to detect a Base Station (BS) and accomplish channel determination and frame synchronization. In a broadband wireless communication system (e.g., an Institute of Electrical and Electronics Engineers (IEEE) 802.16e system), a unique preamble code is defined by a subcarrier set used, and serves as a cell IDentification (ID) of the BS. If being located within a service cell area, each MS can recognize a channel situation between itself and each BS by detecting a unique preamble code used by each BS. By using this channel situation, each MS can request a communication connection to a BS advantageous to itself.

Figure 2:
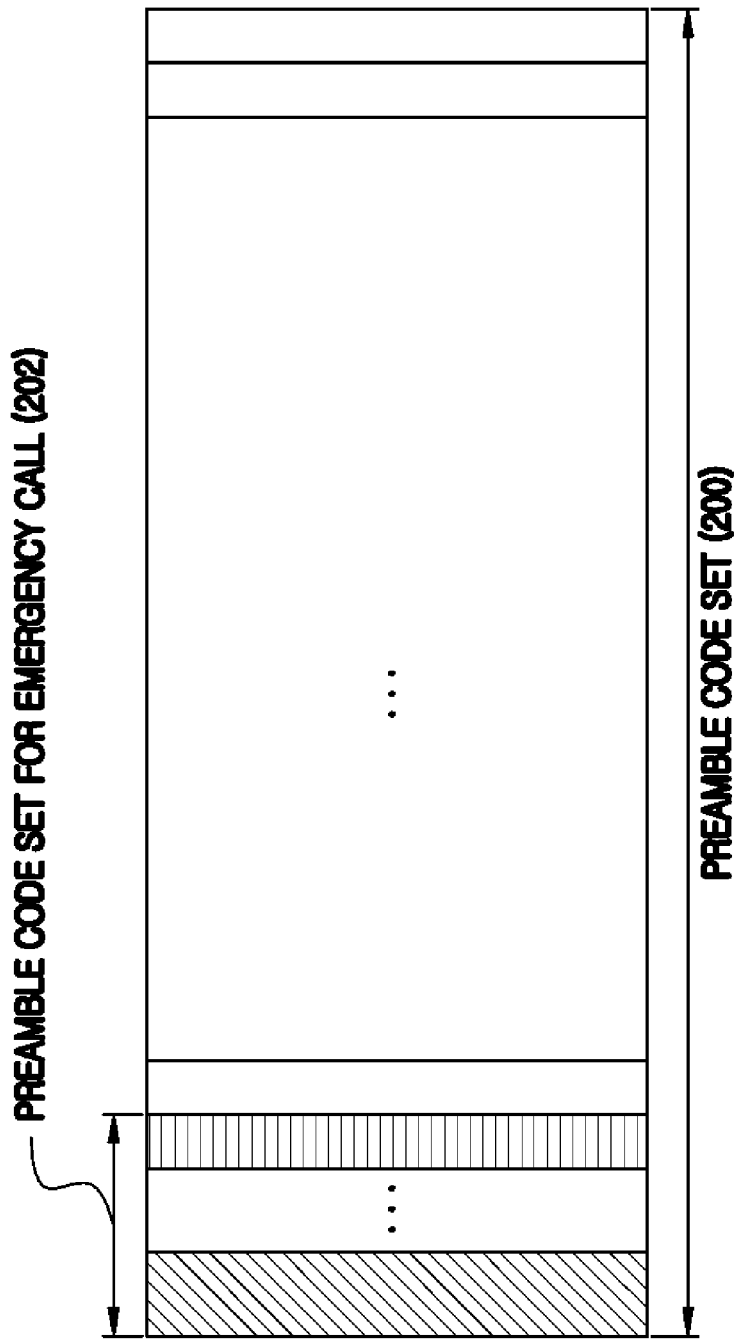
FIG. 2 illustrates an example of the use of a DownLink (DL) preamble for an emergency call service according to an exemplary embodiment of the present invention.

FIG. 2 illustrates an example of the use of a DownLink (DL) preamble for an emergency call service according to an exemplary embodiment of the present invention.

Referring to FIG. 2, partial DL preamble code 202 is selected among the entire preamble signal set 200 and is used as a code for emergency call request and detection. That is, in preparation for simultaneous generation of an emergency call request, one or more preamble codes can be defined for an emergency call service so that, upon an emergency call request, each MS can select and transmit any preamble code among the defined preamble code set. The thus defined preamble code is commonly used in all cells.

If an MS encountering an emergency call situation transmits one of defined preamble codes, a neighbor MS enabling P2P communication receives the preamble code. Upon successfully receiving the preamble code, the neighbor MS recognizes that there is an emergency call request.

Thus, by using part of the entire DL preamble codes in an emergency call situation, an exemplary embodiment of the present invention can support an emergency call service with no overhead or complexity compared to a conventional MS and system.

Figure 3:
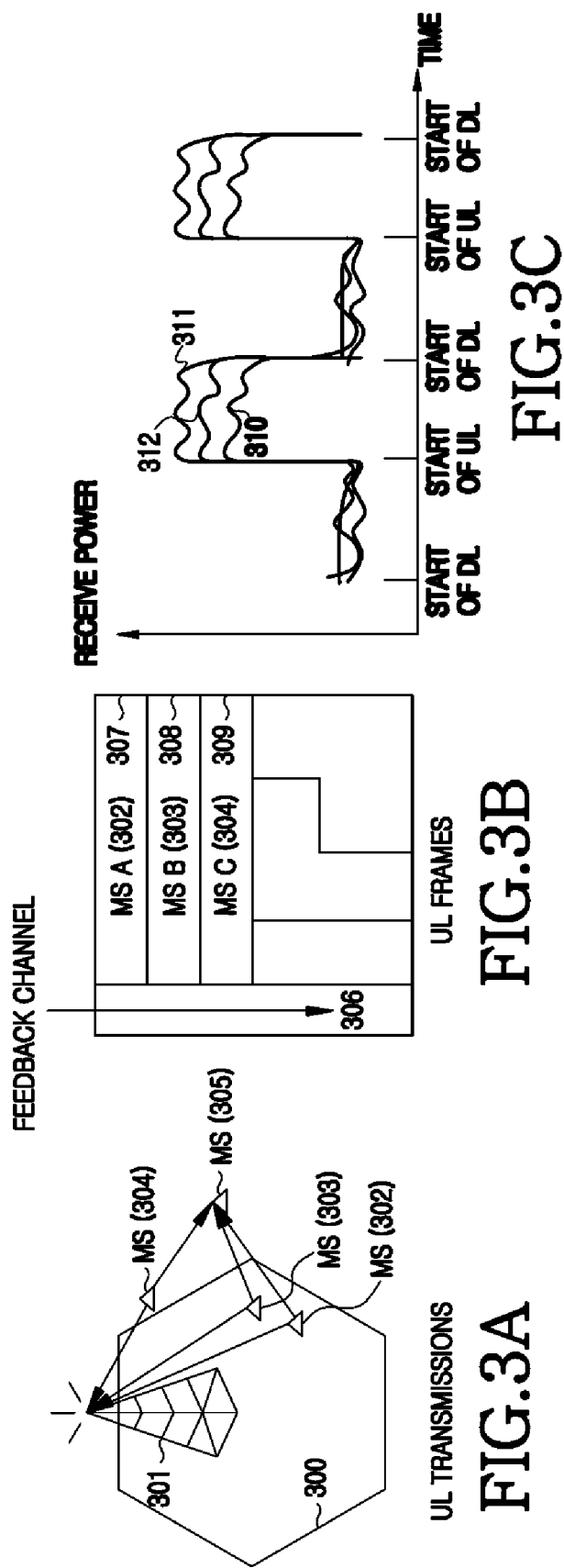
FIGS. 3A, 3B, and 3C illustrate DL frame synchronization in a broadband wireless communication system according to an exemplary embodiment of the present invention.

FIGS. 3A, 3B, and 3C illustrate DL frame synchronization according to an exemplary embodiment of the present invention. As an initial process for efficient emergency call recognition and synchronization, a method for DL frame synchronization determination in an MS requesting an emergency call is described.

Referring to FIG. 3A, it is assumed that MSs 302, 303, and 304 each have data for UpLink (UL) transmission at a cell edge portion of a BS 301. In FIG. 3B, in a UL frame of a frame structure of a broadband wireless communication system, there is a control channel 306 for feeding back a channel state or feeding back acknowledgement/negative acknowledgement (ACK/NACK) information using a start symbol of the UL frame at the head of the UL frame. Also, in UL transmission, a transmit power of the MS is very low compared to a transmit power of the BS 301. Therefore, for efficient transmission, the MSs 302, 303, and 304 each can transmit data using time-frequency resource domains 307, 308, and 309 on a time axis similarly with a proposed structure of the broadband wireless communication system, and can be allocated a plurality of subcarriers. According to realization, the time-frequency resource domains 307, 308, and 309 can be allocated in a burst structure for UL data transmission.

Upon requesting an emergency call from outside of a cell area 300 under this environment, an MS 305 continuously monitors receive powers of the MSs 302, 303, and 304. Because it is not able to directly communicate with the BS 301, the MS 305 may receive a low level power during a DL duration or may detect no receive power. After an end of DL transmission by the BS 301, the MSs 302, 303, and 304 each may transmit UL data through the allocated time-frequency resource domains 307, 308, and 309. At this time, the MS 305 intending to request an emergency call can detect high receive powers 310, 311, and 312. If monitoring the received power levels continuously during the frame, the MS 305 may determine a start of a DL frame and a start of a UL frame as shown in FIG. 3C.

FIG. 3C shows received power levels in the MS 305. On distance, the MS 303 has the highest signal intensity (311), and the MS 302 and the MS 304 may have signal intensities (312) and (310) higher in order. Here, the received power levels of the MS 305 each are individually illustrated. In another exemplary implementation, the MS 305 may receive a total power level obtained by summing up power levels of the three MSs 302, 303, and 304.

Figure 4:
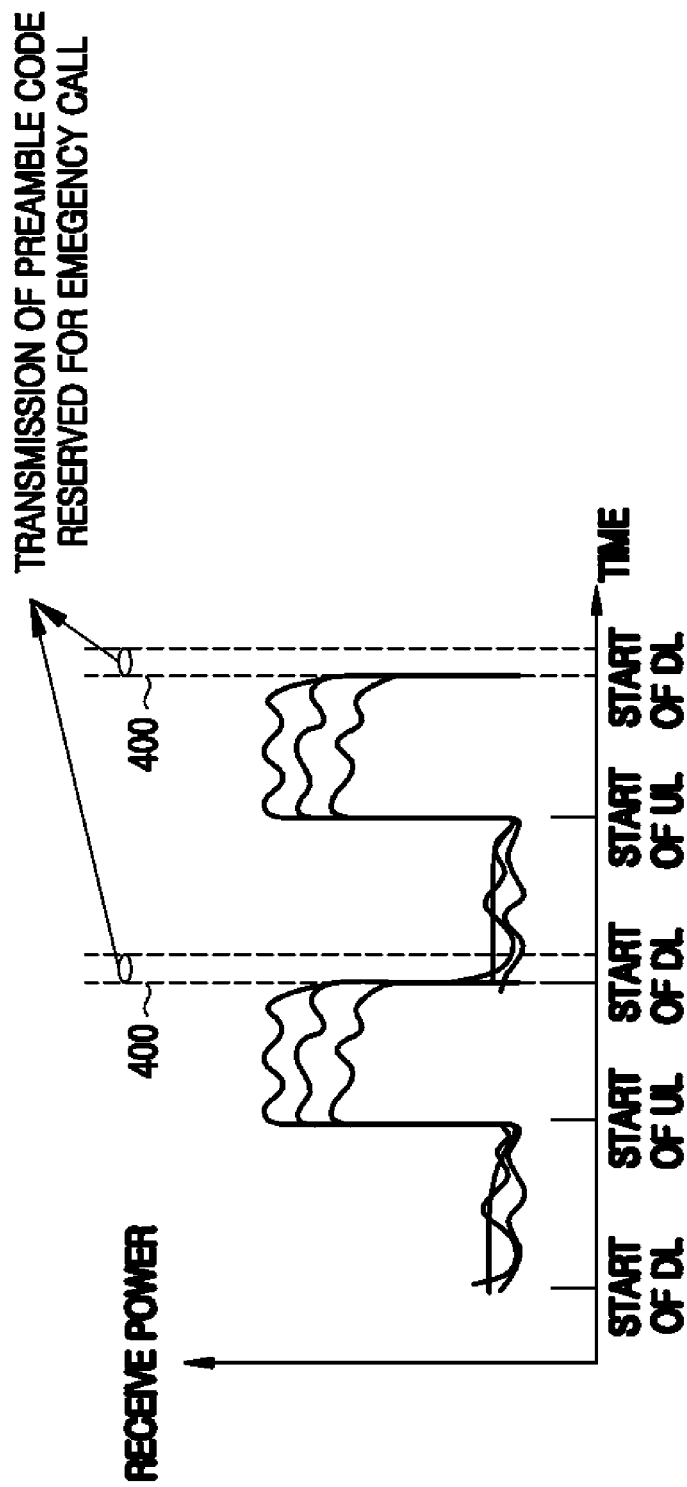
FIG. 4 illustrates a preamble signal transmission according to synchronization according to an exemplary embodiment of the present invention.

As described above, if the MS 305 requesting an emergency call monitors received power levels continuously during a frame, the MS 305 can determine a start of a DL frame or a start of a UL frame. At the determined start 400 of the DL frame, as shown in FIG. 4, the MS 305 requesting an emergency call selects and transmits one of preamble codes defined for emergency call request among the entire preamble code set of FIG. 2.

A frame structure in a broadband wireless communication system is configured to, after preamble transmission (400) during a DL frame, transmit a DL map having DL resource allocation information and a UL map having UL resource allocation information. If, upon preamble transmission, the MS 305 requesting an emergency call actually transmits a preamble code for emergency call request at a delayed time later than a preamble transmission duration, the MSs 302, 303, and 304 located at a cell edge may cause interference in reception of DL map and UL map information. Thus, in order to avoid the interference, the MS initiates to transmit a preamble code at a time that is earlier than the determined start of the DL frame and, if not receiving an ACK to this, transmits a preamble code with a preset time shift. By doing so, the MS 305 can minimize influence on the MSs 302, 303, and 304.

The MSs 302, 303, and 304 within a cell all receive preambles for cell search, synchronization, channel determination, etc. at a start of a DL frame. Because of using part of the entire preamble codes for an emergency call service, the MSs 302, 303, and 304 can detect the emergency call through the same process as cell search. In detail, if a received signal power of an MS from a BS is more than a preset level, it can be determined that the MS has an excellent communication environment with the BS and, in this manner, if a received signal power for a preamble signal reserved for emergency call exceeds a preset threshold value, it can be determined that there is an emergency call request.

Upon receiving a signal power of more than a preset level, one or more the MSs 302, 303, and 304 determine that there is an emergency call request and informs the BS 301 of the occurrence of an emergency call. At this time, the BS 301 performs an operation for an emergency call service. For example, for the purpose of P2P communication between the one or more of MSs 302, 303, and 304 searching for an emergency call and the MS 305 sending an emergency call request, the BS 301 can allocate time-frequency resources or prohibit the use of resources of the time-frequency resource domains predefined for emergency call service. Upon recognizing the emergency call, the one or more MSs 302, 303, and 304 generate ACK packet using their own receive signal levels responsive to an emergency call request signal and MS information such as a channel situation with the BS 301, and transmit the ACK packet to the MS 305 requesting an emergency call. Here, the assumption is that, at a time the one or more MSs 302, 303, and 304 send ACKs to the MS 305, the MS 305 can select one of the MSs 302, 303, and 304 and perform P2P communication with the selected MS.

Figure 5:
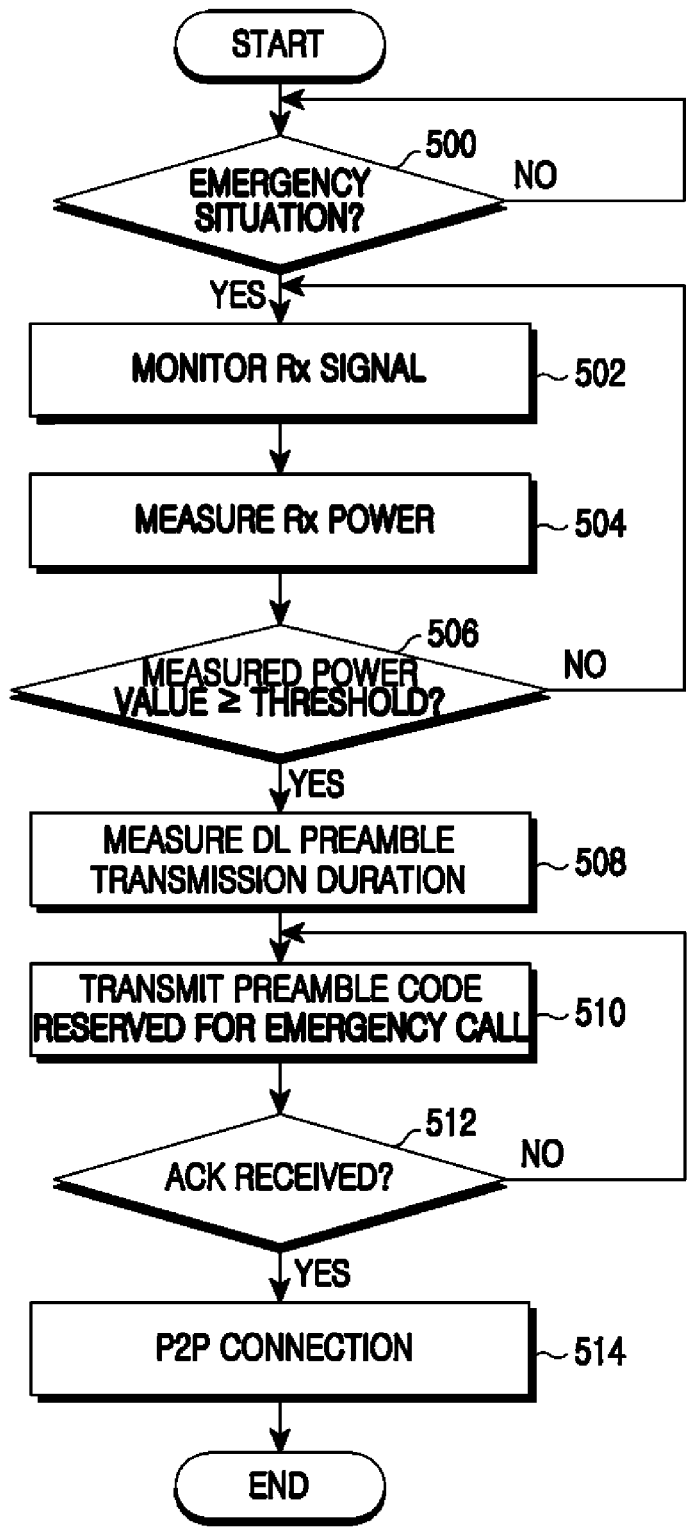
FIG. 5 is a flowchart illustrating an operation of a Mobile Station (MS) for setting up an emergency call of an MS that is out of a service cell area in a broadband wireless communication system according to an exemplary embodiment of the present invention.

FIG. 5 is a flowchart illustrating an operation of an MS for an emergency call setup of an MS that is out of a service cell area in a broadband wireless communication system according to an exemplary embodiment of the present invention.

Referring to FIG. 5, if an MS 305 encounters an emergency situation out of a service coverage area, that is, outside of a cell area in step 500, the MS 305 monitors a received signal in step 502. At this time, the MS 305 is not able to directly communicate with a BS and thus, may detect signals transmitted from one or more neighbor MSs 302, 303, and 304 that are in UL transmission. The MS 305 may receive signals of low level during a DL duration.

In step 504, the MS 305 measures a power of the one or more monitored receive signals. If the measured receive power is less than a threshold in step 506, the MS 305 returns to step 502 and monitors a signal until detecting receive signals of the one or more neighbor MSs 302, 303, and 304. If the measured receive power of step 504 is equal to or more than the threshold in step 506, the MS 305 proceeds to step 508 and measures a DL preamble transmission duration.

Figure 1:
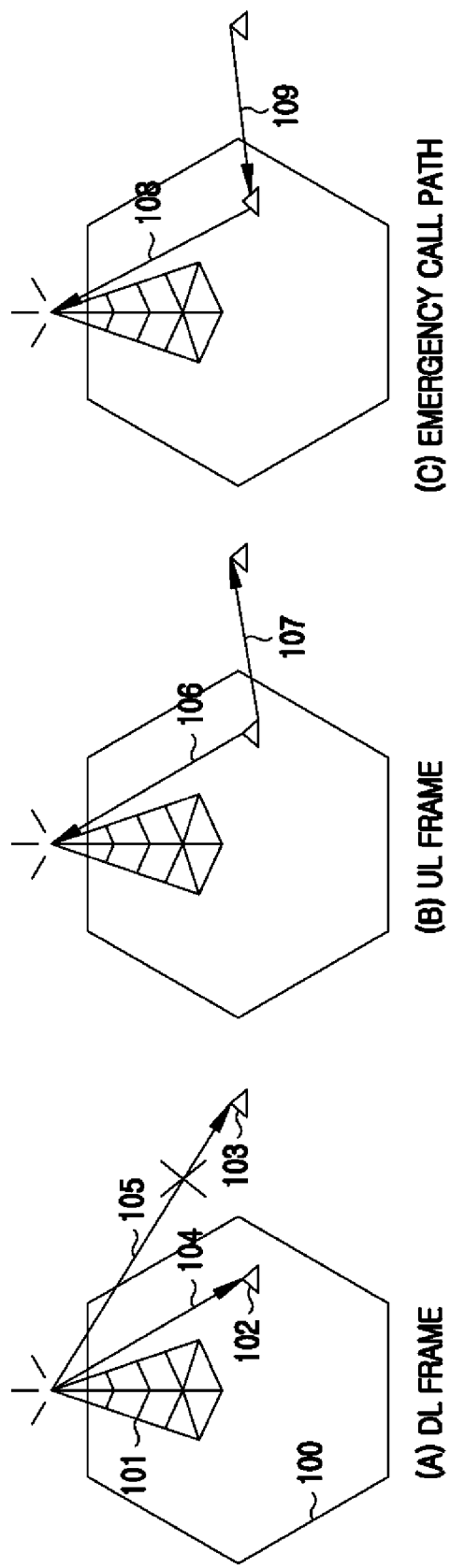
FIGS. 1A, 1B, and 1C illustrate an emergency call using Peer-to-Peer (P2P) communication in a wireless communication system according to a conventional art.

For instance, when a received signal of an MS 103 is continuously monitored in the scenario of FIG. 1, there is a very high probability that the MS 103 detects a power of a signal of a neighbor MS 102 in UL transmission, while there is a very low probability that the MS 103 detects a power of a signal of a BS 101 and thus, DL and UL frame synchronization can be easily performed.

Then, in step 510, the MS 305 selects, randomly or by scheduling, one of the preamble codes reserved for emergency call, and transmits the selected code at a determined start of a DL frame.

Then, in step 512, the MS 305 identifies if an ACK to the preamble is received. Upon receiving the ACK, in step 514, the MS 305 performs P2P connection with the MS 302, 303, or 304 sending the ACK.

Then, the MS 305 terminates the emergency call setup process.

Figure 6:
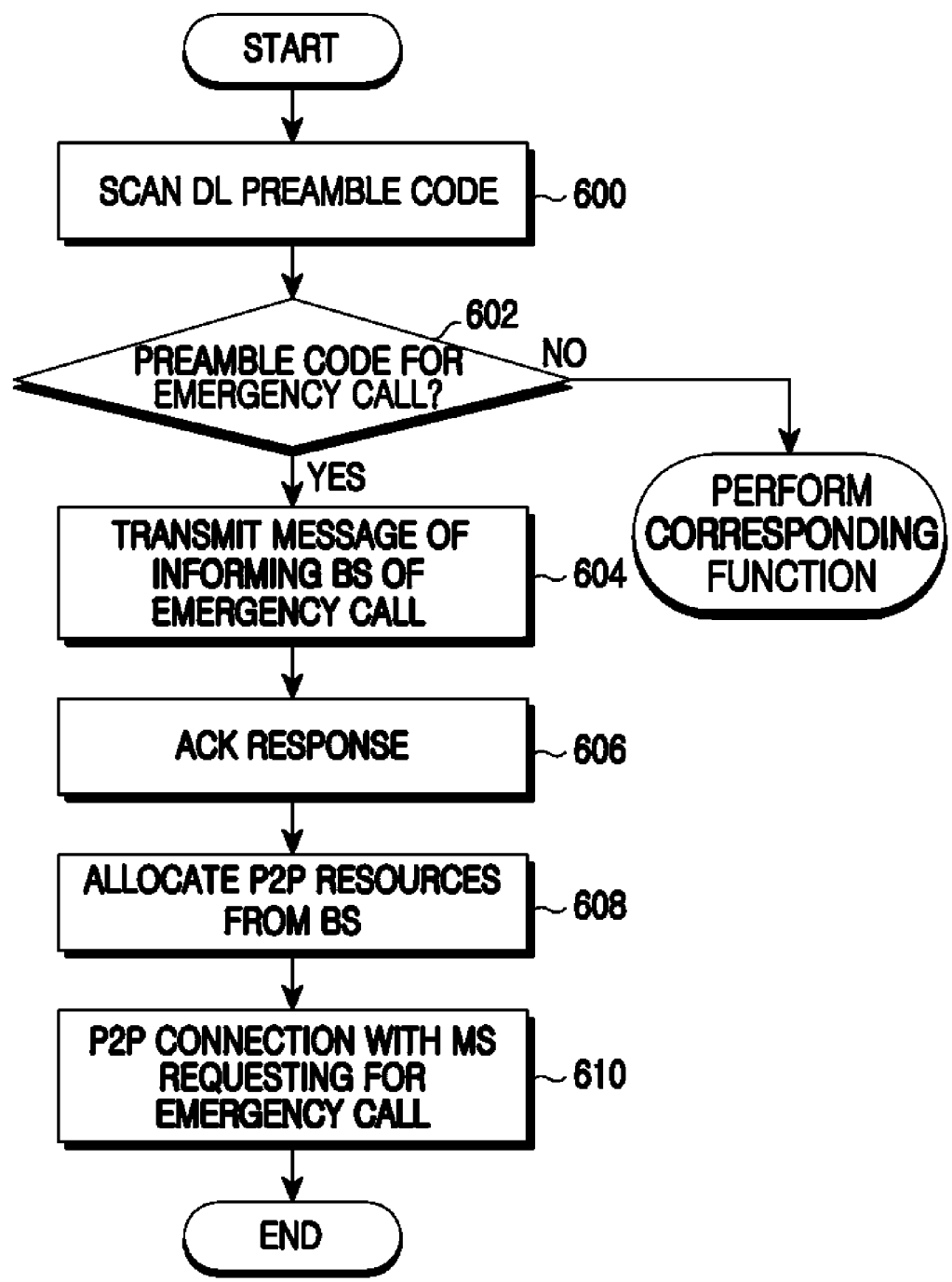
FIG. 6 is a flowchart illustrating an operation of an MS for relaying an emergency call of an MS that is out of a service cell area in a broadband wireless communication system according to an exemplary embodiment of the present invention.

FIG. 6 is a flowchart illustrating an operation of an MS for relaying an emergency call of an MS that is out of a service cell area in a broadband wireless communication system according to an exemplary embodiment of the present invention.

Referring to FIG. 6, in step 600, one or more MS 302, 303, and 304 located at a cell edge portion and connectable with a BS 301 scan a preamble signal during a DL duration.

Then, in step 602, the one or more MSs 302, 303, and 304 determine whether the scanned preamble signal includes a preamble code reserved for emergency call. If the scanned preamble signal is not the preamble code reserved for emergency call, the one or more MSs 302, 303, and 304 operate in a corresponding mode. The corresponding mode is a mode for receiving a preamble of the BS 301, performing cell search, and performing a synchronization process.

If the scanned preamble signal includes the preamble code reserved for emergency call in step 602, the one or more MSs 302, 303, and 304 proceed to step 604 and informs the BS 301 of occurrence of the emergency call. Then, in step 606, the one or more MSs 302, 303, and 304 send an ACK message to an MS 305 sending an emergency call request. Then, in step 608, the one or more MSs 302, 303, and 304 are allocated P2P resources from the BS 301. Then, in step 610, the one or more MSs 302, 303, and 304 perform P2P connection with the MS 305 sending the emergency call request.

Then, the one or more MSs 302, 303, and 304 terminate the emergency call setup process.

Figure 7:
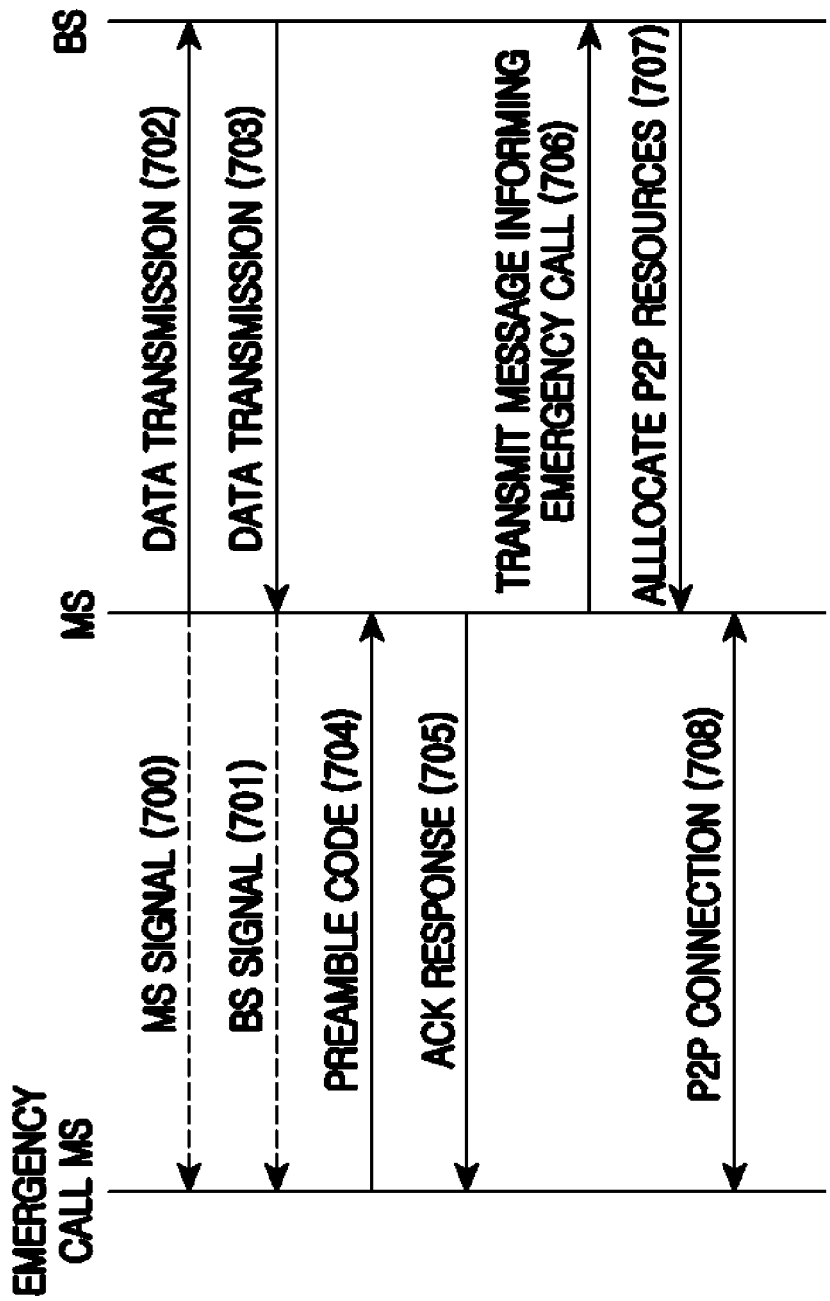
FIG. 7 illustrates a signal flow for setting up an emergency call of an MS that is out of a service cell area in a broadband wireless communication system according to an exemplary embodiment of the present invention.

FIG. 7 is a signal flow for setting up an emergency call of an MS that is out of a service cell area in a broadband wireless communication system according to an exemplary embodiment of the present invention.

Referring to FIG. 7, when one or more MSs 302, 303, and 304 are at a cell edge and perform data transmission (702, 703) with a BS 301, in steps 700 and 701, an MS 305 requesting an emergency call out of a cell area monitors UL signals of the one or more MSs 302, 303, and 304 and a DL signal of the BS 301. That is, the MS 305 measures received signal levels. The MS 305 requesting an emergency call is not synchronized with the BS 301 and thus, is not able to be aware of if a received signal is a signal of the one or more MSs 302, 303, and 304 or a signal of the BS 301. However, if the MS 305 is out of a cell area, it receives a signal of low level from the BS 301 or almost nothing and thus, the MS 305 can determine a duration for which a received signal power is equal to or more than a threshold value as a UL duration and a duration for which a remaining receive signal power is less than the threshold value as a DL duration.

Then, in step 704, the MS 305 transmits a preamble code reserved for emergency call during the DL duration.

Then, in step 705, the MS 305 receives an ACK message from the one or more MSs 302, 303, and 304 that receive the preamble code at the cell edge.

Then, in step 706, the one or more MSs 302, 303, and 304 receiving the preamble code at the cell edge transmit a message of informing the emergency call to the BS 301.

Then, in step 707, the BS 301 allocates P2P resources to enable P2P communication between the MS 305 and the one or more MSs 302, 303, or 304.

Then, in step 708, the MS 305 and the one or more MSs 302, 303, and 304 initiate P2P communication according to a P2P process and the one or more MSs 302, 303, and 304 relay the emergency call of the MS 305 to the BS 301.

Then, the emergency call setup process is terminated.

Figure 8:
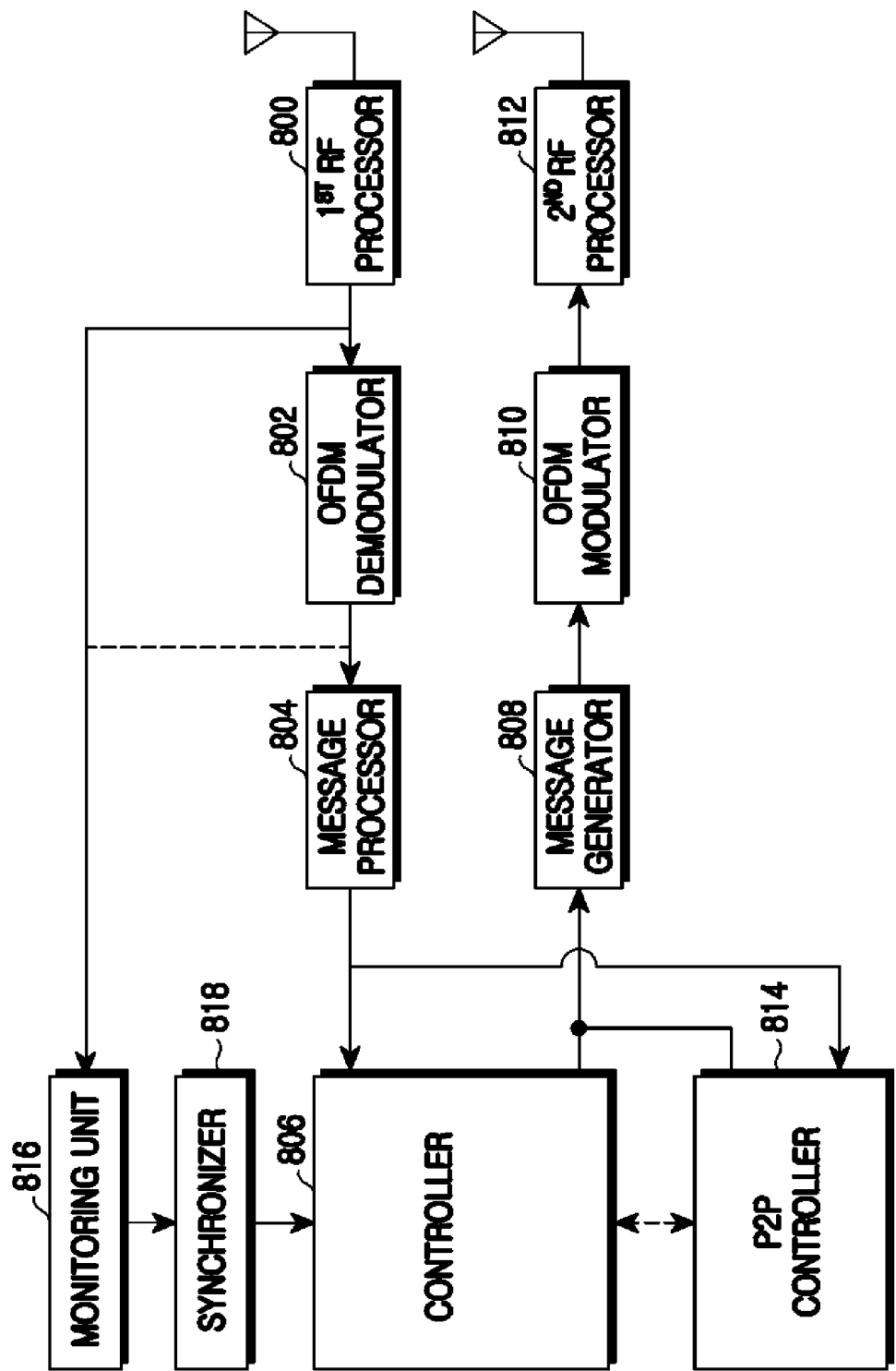
FIG. 8 is a block diagram illustrating a construction of an apparatus for setting up and relaying an emergency call of an MS that is out of a service cell area in a broadband wireless communication system according to an exemplary embodiment of the present invention.

FIG. 8 illustrates a block diagram of an MS for emergency call setup in a broadband wireless communication system according to an exemplary embodiment of the present invention. For description convenience, an MS for forwarding an emergency call at a cell edge and an MS for setting up the emergency call out of the cell edge are described together with reference to FIG. 8.

Referring to FIG. 8, the MS includes a first Radio Frequency (RF) processor 800, an Orthogonal Frequency Division Multiplexing (OFDM) demodulator 802, a message processor 804, a controller 806, a message generator 808, an OFDM modulator 810, a second RF processor 812, a P2P controller 814, a signal monitoring unit 816, and a synchronizer 818.

The first RF processor 800 converts an RF signal received through an antenna into a baseband analog signal. The OFDM demodulator 802 converts the analog signal from the first RF processor 800 into sample data. The OFDM demodulator 802 transforms the sample data into frequency domain data by Fast Fourier Transform (FFT), and selects data of subcarriers actually intended for reception among the frequency domain data. The OFDM demodulator 802 demodulates and decodes data according to a preset modulation level (i.e., a Modulation and Coding Scheme (MCS) level) and outputs the data to the message processor 804.

The message processor 804 analyzes a control message received from the OFDM demodulator 802 and provides the result to the controller 806. In a P2P communication mode, the message processor 804 analyzes a P2P control message received from the OFDM demodulator 802 and provides the result to the P2P controller 814.

The controller 806 performs a corresponding process of information received from the message processor 804 and provides the result to the message generator 808. In the P2P communication mode, the P2P controller 814 performs a corresponding process of control information for P2P communication received from the message processor 804 and provides the result to the message generator 808.

In addition, in case of an MS requesting an emergency call from outside of a cell area, after performing the synchronization, the controller 806 selects one preamble code among a preamble code set reserved for emergency call and transmits the selected preamble code at the synchronized DL start. Here, the reserved preamble code set is part of the entire preamble code set. The controller 806 receives an ACK response message to the preamble for emergency call. Upon a failure to receive the ACK message, the controller 806 reselects and again transmits a preamble code for emergency call.

The P2P controller 814 receives a P2P communication activation control signal from the controller 806 and performs P2P connection with an MS transmitting an ACK message.

The signal monitoring unit 816 monitors an RF signal, and measures and provides a receive signal level to the synchronizer 818. If the receive signal level is equal to or more than a threshold, the synchronizer 818 provides synchronization information on a DL duration and a UL duration to the controller 806.

When monitoring the RF signal, the MS out of the cell area receives a signal of low level from a BS and receives at least one signal of high level from neighbor MSs. In detail, the MS out of the cell area is not able to perform a direct communication connection with the BS and thus, may detect a signal of low level during the DL duration and may detect a signal of high level due to data transmission from the neighbor MSs during the UL duration.

In case of an MS relaying an emergency call at a cell edge portion, the controller 806 scans a preamble code during a DL duration, determines whether the scanned preamble code is a preamble code for emergency call, and transmits an ACK message to the preamble signal for emergency call to an MS requesting an emergency call.

If the scanned preamble code is the preamble code for emergency call, the controller 806 transmits a message of informing the occurrence of an emergency call request to the BS, and is allocated P2P resources from the BS. If the preamble code is not the preamble code for emergency call, the controller 806 performs a preset cell search and synchronization process.

The P2P controller 814 receives a P2P communication activation control signal from the controller 806 and performs a P2P connection process with an MS requesting an emergency call.

The message generator 808 generates a message using each variety of information received from the controller 806 or the P2P controller 814, and outputs the generated message to the OFDM modulator 810 of a physical layer. For example, the message generator 808 generates a message for requesting information on neighbor MSs, etc.

The OFDM modulator 810 codes and modulates data from the message generator 808 according to a preset modulation level (i.e., an MCS level). The OFDM modulator 810 processes the modulated data by Inverse Fast Fourier Transform (IFFT) and outputs sample data (i.e., an OFDM symbol). The OFDM modulator 810 transforms the sample data into an analog signal and outputs the analog signal to the second RF processor 812. The second RF processor 812 converts the analog signal into an RF signal and outputs the RF signal through an antenna.

The controller 806 receives necessary information during execution of a general wireless communication protocol process through a switching center or a BS by a corresponding constituent element of a physical layer, or generates a control signal by a corresponding constituent element of a physical layer. The controller 806 can control a transmitter and a receiver in one of a Time Division Duplex (TDD) mode and a Frequency Division Duplex (FDD) mode.

Alternately, the P2P controller 814 receives necessary information during execution of a general wireless communication protocol process through a switching center or a BS by a corresponding constituent element of a physical layer, or generates a control signal by a corresponding constituent element of a physical layer.

In the aforementioned construction, the controller 806 is a protocol controller and controls the message processor 804, the message generator 808, the P2P controller 814, the signal monitoring unit 816, and the synchronizer 818. That is, the controller 806 can perform functions of the message processor 804, the message generator 808, the P2P controller 814, the signal monitoring unit 816, and the synchronizer 818. These are separately constructed and shown in order to distinguish and describe respective functions in an exemplary embodiment of the present invention. Thus, when a product is actually realized, the product can be constructed so that the controller 806 can process all of the functions. Alternately, the product can be constructed so that the controller 806 can process only part of the functions.

In an exemplary embodiment of the present invention, an emergency call is described for example, but an MS requesting a general call not the emergency call is also applicable.

As described above, an exemplary embodiment of the present invention has an advantage of being capable of providing an efficient emergency call service even out of a cell area without additional overhead or resource waste by, after measuring a receive signal level and performing synchronization, using part of the whole preamble codes reserved for emergency call setup in a broadband wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Mobile Station (MS) for relaying an MS that is out of a cell area in a wireless communication system, the MS comprising:
   a controller for scanning a preamble code during a DownLink (DL) duration, for determining whether the scanned preamble code comprises a preamble code for call setup of the MS that is out of the cell area, and for transmitting a response message to the preamble code for the call setup of the MS out of the cell area,
   wherein, if the scanned preamble code does not comprise the preamble code for the call setup of the MS out of the cell area, the controller performs a preset cell search and a synchronization process.

2. The MS of claim 1, wherein, if the scanned preamble code comprises the preamble code for the call setup of the MS out of the cell area, the controller transmits a message of informing the occurrence of a call setup request of the MS out of the cell area to a Base Station (BS), and performs P2P connection with the MS transmitting the preamble using the P2P resources.

3. A system for performing call setup of a Mobile Station (MS) that is out of a cell area and relaying the MS out of the cell area by an MS that is at a cell boundary, the system comprising:
   a first MS comprising at least one controller for determining a DownLink (DL) duration, for performing synchronization, for selecting one preamble code among a preamble code set reserved for the call setup of the MS out of the cell area, and for operatively controlling transmission of the selected preamble code during the determined DL duration; and
   a second MS comprising at least one controller for scanning a preamble code during the DL duration, for determining whether the scanned preamble code comprises a preamble code for the call setup of the MS out of the cell area, and for operatively controlling transmission of a response message to the preamble signal to the first MS,
   wherein, if the scanned preamble code does not comprise the preamble code for the call setup of the MS out of the cell area, the controller performs a preset cell search and a synchronization process.

4. The system of claim 3, further comprising a Base Station (BS), if the scanned preamble code is the preamble code for the call setup of the MS out of the cell area, for receiving a message of informing the occurrence of a call setup request of the MS out of the cell area, and for allocating resources for Peer-to-Peer (P2P) communication between the first and second MSs.

5. A method for relaying a Mobile Station (MS) that is out of a cell area in a broadband wireless communication system, the method comprising:
   scanning a preamble code during a DownLink (DL) duration;
   determining whether the scanned preamble code is a preamble code for call setup of the MS out of the cell area; and transmitting a response message to the preamble code for the call setup of the MS out of the cell area, if the scanned preamble code is not the preamble code for the call setup of the MS out of the cell area, performing a preset cell search and a synchronization process.

6. The method of claim 5, further comprising:

if the scanned preamble code comprises the preamble code for the call setup of the MS out of the cell area, transmitting a message of informing the occurrence of a call setup request of the MS out of the cell area to a Base Station (BS); and after allocating P2P resources from the BS, performing P2P connection with the MS transmitting the preamble using the P2P resources.

* * * * *